(No Model.)
E. BOLLOTTE.
AUTOMATIC CORN PLANTING ATTACHMENT.
No. 285,560. Patented Sept. 25, 1883.
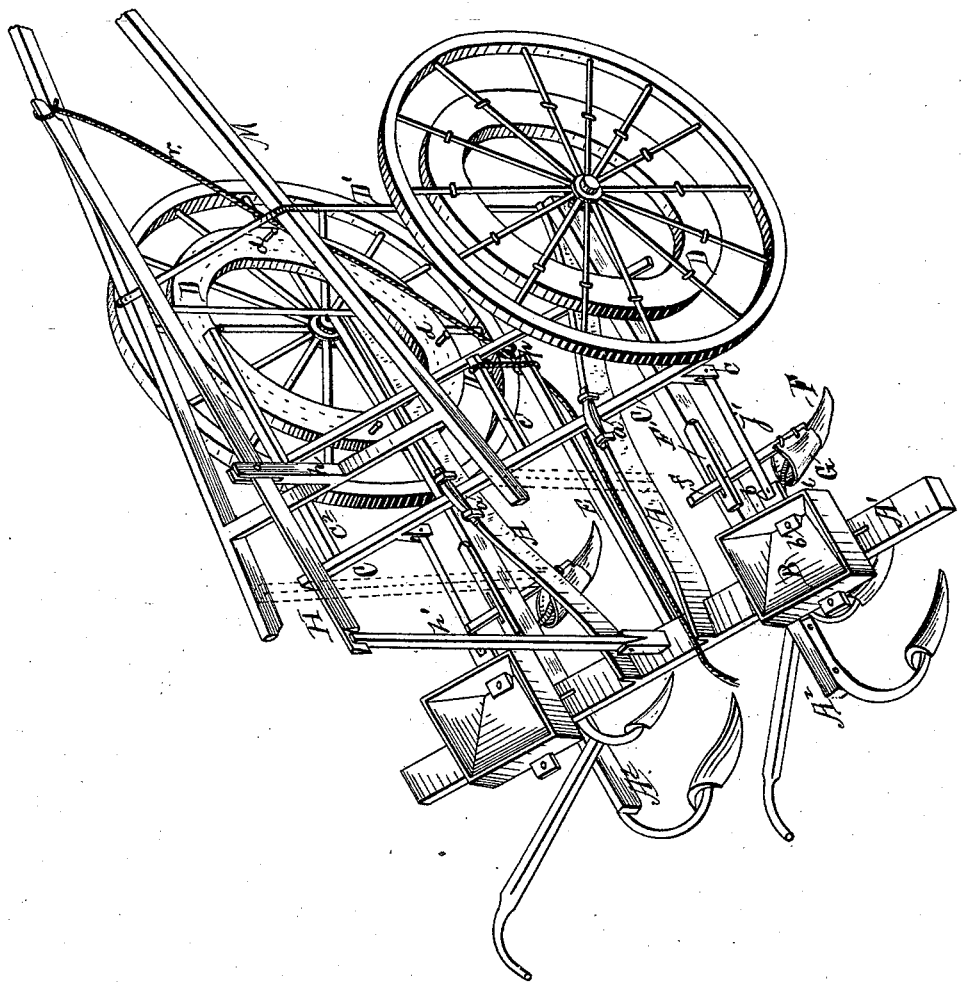
Witnesses:
E. W. Johnson
H. H. Taylor
Inventor:
Etienne Bollotte
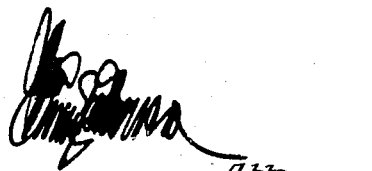
Attorney

United States Patent Office.

ETIENNE BOLLOTTE, OF SOLDIER, SHAWNEE COUNTY, KANSAS.

AUTOMATIC CORN-PLANTING ATTACHMENT.

SPECIFICATION forming part of Letters Patent No. 285,560, dated September 25, 1883.

Application filed January 13, 1882. (No model.)

*To all whom it may concern:*

Be it known that I, ETIENNE BOLLOTTE, a citizen of the United States, residing in Soldier township, in the county of Shawnee and State of Kansas, have invented a new and useful Automatic Corn-Planting Attachment to be Applied to and Used with Walking or Riding Cultivators, of which the following is a specification.

This invention relates to certain new and useful improvements in corn-planters, as will be hereinafter more fully set forth, and pointed out in the claim.

The annexed drawing, which illustrates my invention, is a perspective view, in which I have shown a planter and cultivator constructed in accordance with my invention.

A represents a metallic frame, which is rigidly attached to a transverse bar, A', which is located on the rear of said frame. This frame has near its central portion bearings $a$, in which rests the transverse bar C, which is connected to the seed-slide and a forwardly-projecting lever, which is actuated by the projections $d$ on the ground-wheels. The arms of the frame A diverge, and are provided at their front ends with spindles, to which are attached parallel beams $A^2 A^2$ and the ground-wheels. This frame is connected at its front ends by the standard D', which is provided with an upper horizontal cross-bar, to which is attached the frame M, to which is connected the draft mechanism, which draft mechanism is also connected to the frame A and near the hubs of the wheels. Upon this frame M may be mounted a suitable seat for the driver. The rear portion of this frame M is suitably braced by a standard to the frame A, and it is provided with a cross-bar having a vertical standard, $h$, within which is pivoted a lever, H, which is connected by the bar $h'$ to the rear cross-bar, A', of the frame. At the end of this lever H is attached a flexible connection or cord, $r$, which extends under the frame M, and is secured at any suitable point beneath the machine; or it may be continued, after passing under one of the stationary parts of the frame, so as to be within easy access of the person who follows the machine and operates the cultivator.

By means of the lever H, its connections, and the cord $r$, the rear portion of the machine may be raised, so that the shovels of the cultivators, which are attached to the rear of the beams $A^2 A^2$, may be raised, so as to be free from the ground. To one side of the beams $A^2 A^2$ are attached the seed-spouts $e$, which lead from the apertures in the feed-boxes B to the shoes G, which shoes are provided with shovels F, said shovels and shoes being supported by the standard $f$, which is attached to the beam by the plate F'.

The seed-boxes, which are attached to the cross-bar A' of the frame, are of usual construction, and they are provided with reciprocating slides $b$, which are provided with orifices $b'$, which contain the seed to be planted. These seed-boxes are secured to the transverse bar A', so as to be adjustable laterally thereon. These seed-slides are provided at their front ends with the connecting-bars $j'$, which are attached to the downwardly-projecting arm $c$ of the rock-shaft C, which is connected to the frame A and journaled therein. This rock-shaft is provided near its central portion with a forwardly-projecting arm, $c'$, to which is attached at the end thereof a cord, $p$, which may be secured to the beam E when it is desirable to prevent the operation of the seed-slides. This rock-shaft C is also provided with a forwardly-projecting arm, $c^2$. This forwardly-projecting arm $c^2$ strikes against the projections $d$ on the ground-wheel. When the ground-wheels are rotated, these pins or projections raise the arms and operate the seed-slides.

The ground-wheels are provided with rings D, which have a suitable number of perforations, and the pins $d$ may be removed from the one set of perforations to another, and thereby vary the movement of the seed-slides as compared with the rotation of the ground-wheels.

Having thus described my invention, what I claim as new, and desire to secure by Letters Patent, is—

In a combined seeder and cultivator, the frame having diverging beams A A, transverse beam A', parallel beams $A^2 A^2$, and supporting-wheels attached to the forward part of the frame, substantially as shown and described.

ETIENNE BOLLOTTE.

Witnesses:
HENRY H. BRICKLEY,
ELIAS SHULL.